(12) United States Patent
Nakano et al.

(10) Patent No.: US 10,094,262 B2
(45) Date of Patent: Oct. 9, 2018

(54) CONCENTRATION DETERMINATION DEVICE AND METHOD

(71) Applicant: NGK SPARK PLUG CO., LTD., Nagoya-shi, Aichi (JP)

(72) Inventors: Yoshihiro Nakano, Komaki (JP); Shiro Kakimoto, Kasugai (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 98 days.

(21) Appl. No.: 15/170,177

(22) Filed: Jun. 1, 2016

(65) Prior Publication Data

US 2016/0356196 A1 Dec. 8, 2016

(30) Foreign Application Priority Data

Jun. 2, 2015 (JP) ................................. 2015-112217
May 23, 2016 (JP) ................................. 2016-102638

(51) Int. Cl.
*F01N 3/00* (2006.01)
*F01N 3/10* (2006.01)
(Continued)

(52) U.S. Cl.
CPC ............... *F01N 3/208* (2013.01); *F01N 9/00* (2013.01); *F01N 2560/021* (2013.01); *F01N 2560/026* (2013.01); *F01N 2610/02* (2013.01); *F01N 2610/1453* (2013.01); *F01N 2900/1818* (2013.01); *Y02T 10/24* (2013.01); *Y02T 10/47* (2013.01)

(58) Field of Classification Search
CPC ........ F01N 3/206; F01N 3/2066; F01N 3/208; F01N 9/00; F01N 2560/021; F01N 2560/026; F01N 2610/02; F01N 2610/1453; F01N 2900/1818; Y02T 10/24; Y02T 10/47
USPC .......................... 60/276, 285, 286, 301, 303
See application file for complete search history.

(56) References Cited

U.S. PATENT DOCUMENTS

2010/0115918 A1* 5/2010 Sawada .................. B01D 53/30
60/276
2011/0138874 A1* 6/2011 Murase ................. F02D 41/123
73/1.06
(Continued)

FOREIGN PATENT DOCUMENTS

JP 2014-224504 A 12/2014

*Primary Examiner* — Phutthiwat Wongwian
*Assistant Examiner* — Diem Tran
(74) *Attorney, Agent, or Firm* — Sughrue Mion, PLLC

(57) ABSTRACT

A multi-gas sensor controller 9 is provided in an urea SCR system 1 with an SCR catalyst 4, an aqueous urea injector 5 and a multi-gas sensor 8 (ammonia sensor unit and NOx sensor unit). The multi-gas sensor controller 9 determines the concentration of ammonia in exhaust gas flowing out of the SCR catalyst 4, as a downstream ammonia concentration value, based on a detection result of the ammonia detection unit. The multi-gas sensor controller 9 controls the aqueous urea injector 5 to supply urea to the SCR catalyst 4 in a fuel-cut state. Further, the multi-gas sensor controller 9 correct the determined downstream ammonia concentration value based on a detection result of the NOx detection unit and an oxygen concentration of the exhaust gas after the supply of urea to the SCR catalyst with the control of the aqueous urea injector 5 by the controller 9.

9 Claims, 12 Drawing Sheets

(51) Int. Cl.
*F01N 3/20* (2006.01)
*F01N 9/00* (2006.01)

(56) References Cited

U.S. PATENT DOCUMENTS

| | | | |
|---|---|---|---|
| 2011/0202253 A1* | 8/2011 | Perry | B01D 53/9477 701/102 |
| 2012/0090296 A1* | 4/2012 | Yacoub | F01N 3/208 60/274 |
| 2014/0130483 A1* | 5/2014 | Miyake | F01N 3/208 60/285 |

* cited by examiner

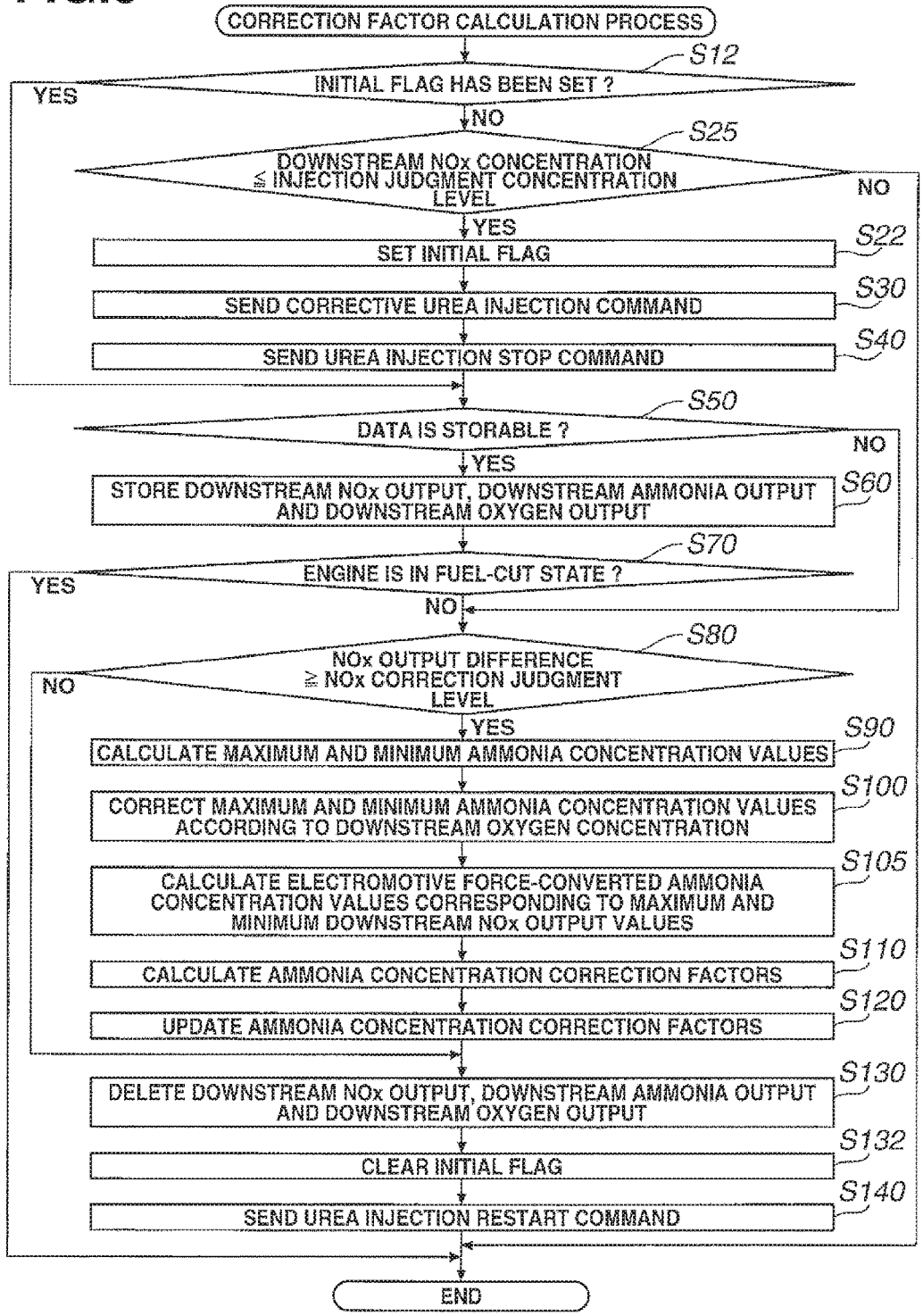

CONCENTRATION DETERMINATION DEVICE AND METHOD

FIELD OF THE INVENTION

The present invention relates to a concentration determination device and method for determining the concentration of ammonia released from a selective catalytic reduction catalyst.

BACKGROUND OF THE INVENTION

Conventionally, there is known a system for purifying NOx in an exhaust gas of an internal combustion engine by arranging a SCR (Selective Catalytic Reduction) catalyst in an exhaust pipe of the internal combustion engine and injecting urea as a reducing agent to the SCR catalyst. This purification system is commonly equipped with a NOx sensor and an ammonia sensor for detection of NOx and ammonia emissions from the SCR catalyst. It has been proposed to correct an output value of the ammonia sensor by comparison of an output value of the NOx sensor with the output value of the ammonia sensor (see, for example, Patent Document 1: Japanese Laid-Open Patent Application Publication No. 2014-224504).

SUMMARY OF THE INVENTION

In Patent Document 1, the output value of the ammonia sensor is corrected on the basis of only a value of division of the NOx sensor output value by the ammonia sensor output value or a value of difference between the NOx sensor output value and the ammonia sensor output value. This results in a low accuracy of the ammonia concentration determination result after the sensor output correction.

The present invention has been made in view of the foregoing problem. It is an object to improve ammonia concentration determination accuracy after sensor output correction.

In order to achieve the above-mentioned object, there is provided according to a first aspect of the present invention a concentration determination device for a purification system, the purification system comprising: a selective catalytic reduction catalyst arranged in an exhaust pipe of an internal combustion engine to purify NOx in an exhaust gas of the internal combustion engine; an urea supply unit arranged to supply urea as a reducing agent to the selective catalytic reduction catalyst; an ammonia sensor arranged to detect, as a downstream ammonia concentration, an ammonia concentration of the exhaust gas flowing out of the selective catalytic reduction catalyst; and a NOx sensor arranged to detect, as a downstream NOx concentration, a NOx concentration of the exhaust gas flowing out of the selective catalytic reduction catalyst, the concentration determination device being configured to determine the downstream ammonia concentration based on a detection result of the ammonia sensor.

The concentration determination device of the first aspect comprises an urea supply control section and an urea supply correction section. The urea supply control section controls the urea supply unit to supply the urea to the selective catalytic reduction catalyst in a fuel-cut state where fuel supply to the internal combustion engine is stopped. The urea supply correction section corrects the determined value of the downstream ammonia concentration based on a detection result of the NOx sensor and an oxygen concentration of the exhaust gas after the supply of the urea to the selective catalytic reduction catalyst with the control of the urea supply unit by the urea supply control section.

As mentioned above, the concentration determination device of the first aspect is configured to permit the supply of urea from the urea supply unit in the fuel-cut state. In the fuel-cut state, the fuel supply to the internal combustion engine is stopped so that NOx is not contained in the exhaust gas of the internal combustion engine. Herein, the NOx sensor performs concentration detection responsive to not only NOx but also ammonia. Thus, the detection result of the NOx sensor is in correlation with the ammonia concentration after the urea is supplied to the selective catalytic reduction catalyst in such an amount as to allow leakage of the urea to the downstream side in the fuel-cut state. It is therefore possible in the first aspect to, even in the case where the detection result of the ammonia sensor is not stable due to secular variations or daily variations, ensure the stability of the determined downstream ammonia concentration value by correcting the determined downstream ammonia concentration value based on the detection result of the NOx sensor.

Since the downstream ammonia concentration detection result of the NOx sensor varies depending on the oxygen concentration of the exhaust gas, the concentration determination device corrects the determined downstream ammonia concentration value based on not only the downstream NOx concentration detection result of the NOx sensor as well as the oxygen concentration of the exhaust gas. It is therefore possible further improve the determination accuracy of the downstream ammonia concentration.

The concentration determination device of the first aspect may be configured to convert the detection result of the ammonia sensor to an ammonia concentration value according to an ammonia concentration correction formula and determine the ammonia concentration value as the downstream ammonia concentration. The ammonia concentration correction formula represents a correlation of a first converted ammonia concentration, which is calculated according to a correlation formula between the detection result of the ammonia sensor and the ammonia concentration of the exhaust gas, with a second converted ammonia concentration, which is calculated from the NOx sensor detection result and the oxygen concentration of the exhaust gas.

In this case, it is possible to allow the urea supply correction section to correct the determined downstream ammonia concentration value by updating the ammonia concentration correction formula.

The concentration determination device of the first aspect may further include a prohibition section that prohibits the urea supply correction section from updating the ammonia concentration correction formula when the NOx concentration of the exhaust gas exceeds a predetermined prohibition judgement concentration level.

It is possible in this case to, under a situation that a large amount of NOx is contained in the exhaust gas even in the fuel-cut state, avoid correcting the determined downstream ammonia concentration value based on the detection result of the NOx sensor and thereby further improve the determination accuracy of the downstream ammonia concentration.

In order to achieve the above-mentioned object, there is also provided according to a second aspect of the present invention a concentration determination device for a purification system, the purification system comprising: a selective catalytic reduction catalyst arranged in an exhaust pipe of an internal combustion engine to purify NOx in an exhaust gas of the internal combustion engine; an ammonia supply unit arranged to supply ammonia as a reducing agent to the selective catalytic reduction catalyst; an ammonia sensor arranged to detect, as a downstream ammonia concentration, an ammonia concentration of the exhaust gas flowing out of the selective catalytic reduction catalyst; and a NOx sensor arranged to detect, as a downstream NOx concentration, a NOx concentration of the exhaust gas flowing out of the selective catalytic reduction catalyst, the concentration determination device being configured to determine a value of the downstream ammonia concentration based on a detection result of the ammonia sensor.

The concentration determination device of the second aspect comprises an ammonia supply control section and an ammonia supply correction section. The ammonia supply control section controls the ammonia supply unit to supply the ammonia to the selective catalytic reduction catalyst in a fuel-cut state where fuel supply to the internal combustion engine is stopped. The ammonia supply correction section corrects the determined value of the downstream ammonia concentration based on a detection result of the NOx sensor and an oxygen, concentration of the exhaust gas after the supply of the ammonia to the selective catalytic reduction catalyst with the control of the ammonia supply unit by the ammonia supply control section.

As mentioned above, the concentration determination device of the second aspect is configured to determine and correct the downstream ammonia concentration with the supply of the ammonia in place of supplying the urea. It is therefore possible in the second aspect to obtain the same effects as in the first aspect.

In each of the concentration determination devices of the first and second aspects, the NOx sensor may be in the form of a limiting-current gas sensor. The limiting-current NOx sensor performs oxygen pumping action on the exhaust gas introduced therein so as to maintain the oxygen concentration of the exhaust gas in the NOx sensor at a constant value. Namely, the limiting-current NOx sensor has the function of detecting the oxygen concentration of the exhaust gas according to the amount of oxygen pumped in or out by the NOx sensor.

By the use of such a limiting-current gas sensor, it is possible to simplify the configuration of the purification system without the need to provide a separate oxygen sensor for detecting the oxygen concentration of the exhaust gas.

Furthermore, the ammonia sensor and the NOx sensor may be combined into one as an integrated gas sensor in each of the concentration determination devices of the first and second aspects.

In this case, the ammonia sensor and the NOx sensor are used to detect the downstream ammonia concentration of the exhaust gas in substantially the same region. Namely, the ammonia sensor and the NOx sensor do not differ in their exhaust gas concentration detection region. By the use of such an integrated gas sensor, it is possible to further improve the determination accuracy of the downstream ammonia concentration.

In order to achieve the above-mentioned object, there is provided according to a third aspect of the present invention a concentration determination method for a purification system, the purification system comprising a selective catalytic reduction catalyst, an urea supply unit, an ammonia sensor and a NOx sensor, the concentration determination method being for determining a downstream ammonia concentration based on a detection result of the ammonia sensor.

The concentration determination method of the third aspect includes an urea supply control step and an urea supply correction step. In the urea supply control step, the urea supply unit is controlled to supply to urea to the selective catalytic reduction catalyst in a fuel-cut state where fuel supply to the internal combustion engine is stopped. In the urea supply correction step, the determined downstream ammonia concentration is corrected based on a detection result of the NOx sensor and an oxygen concentration of the exhaust gas after the supply of the urea from the urea supply unit to the selective catalytic reduction catalyst under the urea supply control step.

As the concentration determination method of the third aspect is executed in the concentration determination device of the first aspect, it is possible in the third aspect to obtain the same effects as in the first aspect.

In order to achieve the above-mentioned object, there is provided according to a fourth aspect of the present invention a concentration determination method for a purification system, the purification system comprising a selective catalytic reduction catalyst, an ammonia supply unit, an ammonia sensor and a NOx sensor, the concentration determination method being for determining a downstream ammonia concentration based on a detection result of the ammonia sensor.

The concentration determination method of the fourth aspect includes an ammonia supply control step and an ammonia supply correction step. In the ammonia supply control step, the ammonia supply unit is controlled to supply ammonia to the selective catalytic reduction catalyst in a fuel-cut state where fuel supply to the internal combustion engine is stopped. In the ammonia supply correction step, the determined downstream ammonia concentration is corrected based on a detection result of the NOx sensor and an oxygen concentration of the exhaust gas after the supply of the ammonia from the ammonia supply unit to the selective catalytic reduction catalyst under the ammonia supply control step.

As the concentration determination method of the forth aspect is executed in the concentration determination device of the second aspect, it is possible in the fourth aspect to obtain the same effects as in the second aspect.

BRIEF DESCRIPTION OF THE DRAWINGS

FIG. 9 is a flow chart for a concentration determination process according to a second embodiment of the present invention.

DESCRIPTION OF EMBODIMENTS

First Embodiment

Hereinafter, a first embodiment of the present invention will be described below with reference to the drawings.

Figure 1:
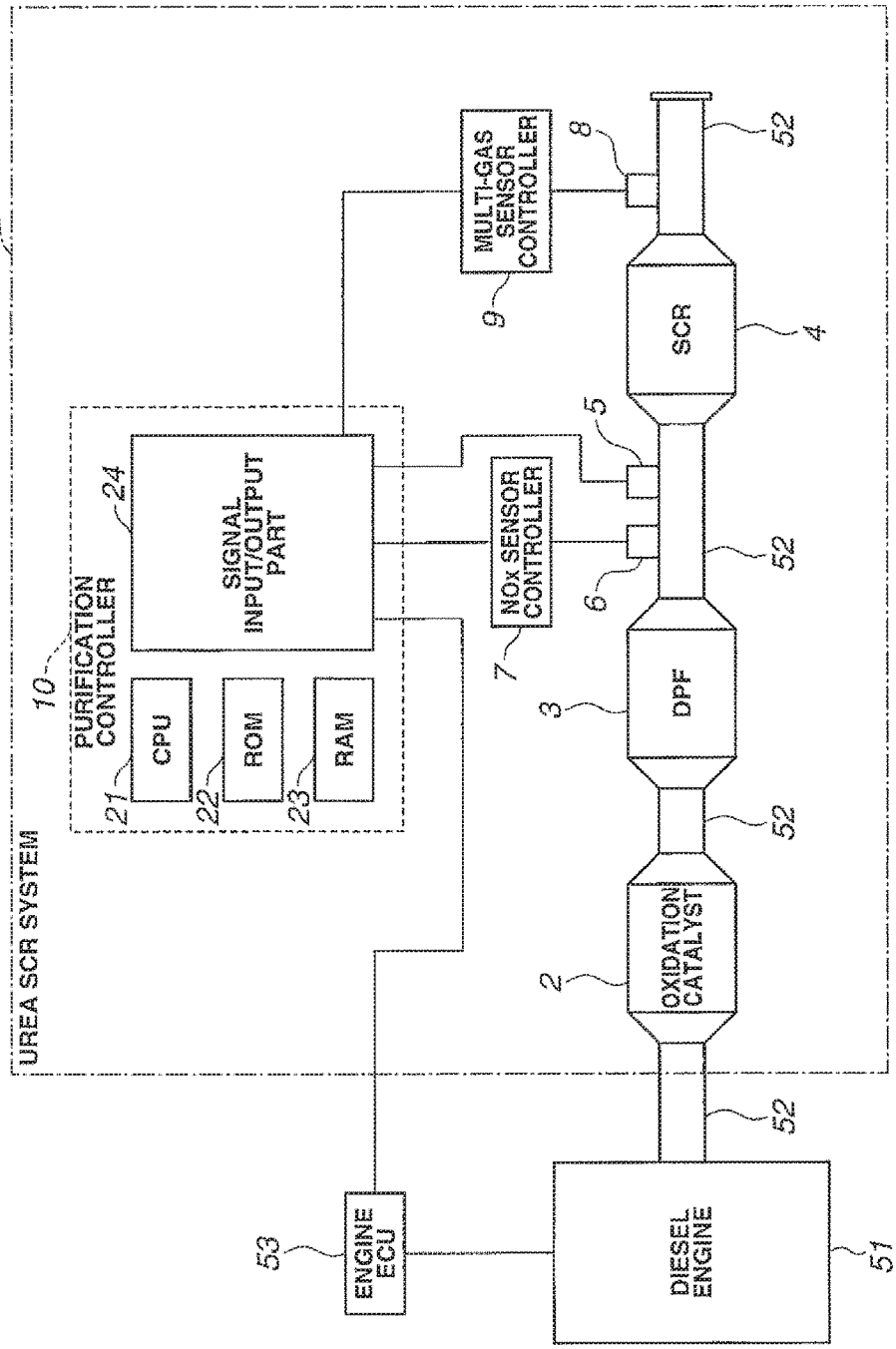
FIG. 1 is a schematic view of an urea SCR system 1 according to a first embodiment of the present invention.

As shown in FIG. 1, an urea SCR (Selective Catalytic Reduction) system 1 according to the first embodiment of the present invention includes an oxidation catalyst 2, a DPF (Diesel Particulate Filter) unit 3, an SCR catalyst 4, an aqueous urea injector 5, an upstream NOx sensor 6, a NOx sensor controller 7, a multi-gas sensor 8, a multi-gas sensor controller 9 and a purification controller 10.

The oxidation catalyst 2 is arranged to take in an exhaust gas from a diesel engine 51 through an exhaust pipe 52 and, among NOx components in the exhaust gas, oxidize nitric oxide (NO) to nitrogen dioxide ($NO_2$).

The DPF unit 3 is arranged to take in the exhaust gas flowing out of the oxidation catalyst 2 through the exhaust pipe 52 and remove particulate matter from the exhaust gas.

The SCR catalyst 4 is arranged to, while generating ammonia by hydrolysis of urea supplied from the upstream side, take in the exhaust gas flowing out of the DPF unit 3 through the exhaust pipe 52, convert NOx in the exhaust gas to nitrogen and water by the reducing action of the generated ammonia and thereby release the NOx-reduced exhaust gas.

The aqueous urea injector 5 is arranged in the exhaust pipe 52 at a position between the DPF unit 3 and the SCR catalyst 4 to inject aqueous urea into the exhaust gas. The injected aqueous urea is hydrolyzed to ammonia gas under high-temperature conditions so that the ammonia gas is used as the reducing agent for reduction of NOx as mentioned above.

The upstream NOx sensor 6 is arranged in the exhaust pipe 52 at a position between the DPF unit 3 and the SCR catalyst 4 to detect the concentration of NOx in the exhaust gas flowing out of the DPF unit 3.

The NOx sensor controller 7 is configured to control the operations of the upstream NOx sensor 6 and determine the concentration of NOx in the exhaust gas flowing out of the DPF unit 3 (hereinafter also referred to as "upstream NOx concentration") based on the detection result of the upstream NOx sensor 6. Further, the NOx sensor controller 7 is configured to perform data communication with the purification controller 10 through a communication line such that upstream NOx concentration data indicating the upstream NOx concentration can be transmitted to the purification controller 10.

The multi-gas sensor 8 is arranged on the downstream side of the SCR catalyst 4 in the exhaust pipe 52 to detect the concentrations of NOx and ammonia in the exhaust gas flowing out of the SCR catalyst 4.

The multi-gas sensor controller 9 is configured to control the operations of the multi-gas sensor 8 and determine the concentrations of NOx, oxygen and ammonia in the exhaust gas flowing out of the SCR catalyst 4 (hereinafter also referred to as "downstream NOx concentration", "downstream oxygen concentration" and "downstream ammonia concentration", respectively) based on the detection results of the multi-gas sensor 8. Further, the multi-gas sensor controller 9 is configured to perform data communication with the purification controller 10 through a communication line such that downstream NOx concentration data indicating the downstream NOx concentration and downstream ammonia concentration data indicating the downstream ammonia concentration can be transmitted to the purification controller 10.

The purification controller 10 has, as its main body, a microcomputer equipped with a CPU 21, a ROM 22, a RAM 23 and a signal input/output part 24. The aqueous urea injector 5, the NOx sensor controller 7 and the multi-gas sensor controller 9 are connected to the signal input/output part 24. As mentioned above, the purification controller 10 is configured to perform data communication with the NOx sensor controller 7 and the multi-gas sensor controller 9 through the communication lines. The purification controller 10 is also configured to perform data communication with an electronic control unit 53 through a communication line. The electronic control unit 53 is arranged to control the operations of the diesel engine 51. Hereinafter, the electronic control unit 53 is also referred to as "engine ECU (Electronic Control Unit) 53".

Figure 2:
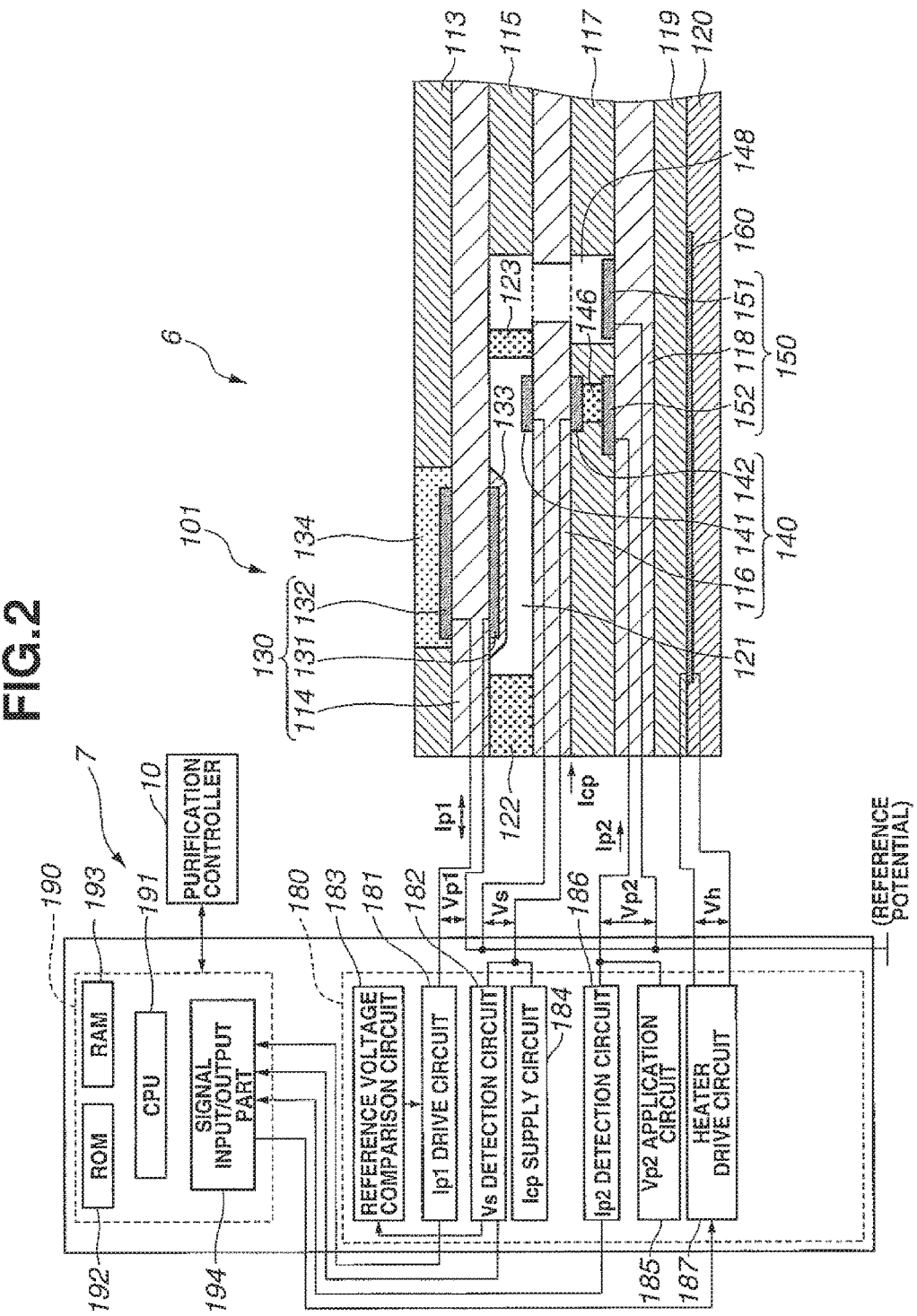
FIG. 2 is a configuration diagram of an upstream NOx sensor 6 and a NOx sensor controller 7 in the urea SCR system.

As shown in FIG. 2, the upstream NOx sensor 6 includes an insulating layer 113, a solid electrolyte layer 114, an insulating layer 115, a solid electrolyte layer 116, an insulating layer 117, a solid electrolyte layer 118, an insulating layer 119 and an insulating layer 120 stacked together in this order. In the first embodiment, the insulating layer 113, 115, 117, 119 and 120 are formed predominantly of alumina; and the solid electrolyte layers 114, 116 and 118 are formed predominantly of oxygen ion conductive zirconia.

There is a first measurement chamber 121 defined between the solid electrolyte layer 114 and the solid electrolyte layer 116 in the upstream NOx sensor 6. In a NOx sensor unit 101 of the upstream NOx sensor, a diffusion resistance member 122 is disposed between the solid electrolyte layer 114 and the solid electrolyte layer 116 at one side adjacent to the first measurement chamber 121 such that the exhaust gas is introduced from the outside into the first measurement chamber 121 via the diffusion resistance member 122. A diffusion resistance member 123 is disposed between the solid electrolyte layer 114 and the solid electrolyte layer 116 at the other side adjacent to the first measurement chamber 121 such that the exhaust gas is discharged to the outside of the first measurement chamber 121 via the diffusion resistance member 123. These diffusion resistance members 122 and 123 are formed of a porous material such as alumina.

The upstream NOx sensor 6 has a first pumping cell 130 constituted by the solid electrolyte layer 114 and pumping electrodes 131 and 132. In the first embodiment, the pumping electrodes 131 and 132 are formed predominantly of platinum. The pumping electrode 131 is disposed on a surface of the solid electrolyte layer 114 in contact with the first measurement chamber 121. A protection layer 133 is formed of a porous material so as to cover a surface of the pumping electrode 131 facing the first measurement chamber 121. The pumping electrode 132 is disposed on a surface of the solid electrolyte layer 114 opposite from the pumping electrode 131. A portion of the insulating layer 113 corresponding in position to the pumping electrode 132 and its vicinity is removed. A porous material 134 is filled in this portion, in place of the insulating layer 113, so as to allow therethrough a flow of gas (oxygen) between the pumping electrode 132 and the outside.

The upstream NOx sensor 6 also has an oxygen concentration detection cell 140 constituted by the solid electrolyte layer 116, a detection electrode 141 and a reference electrode 142. In the first embodiment, the detection electrode 141 and the reference electrode 142 are formed predominantly of platinum. The detection electrode 141 is disposed on a surface of the solid electrolyte layer 116 in contact with the first measurement chamber 121 at a position downstream of the pumping electrode 131 (i.e. a position closer to the diffusion resistance member 123 than the diffusion resistance member 122) within the first measurement chamber 121. The reference electrode 142 is disposed on a surface of the solid electrolyte layer 116 opposite from the detection electrode 141.

In the upstream NOx sensor 6, there is a reference oxygen chamber 146 defined between the solid electrolyte layer 116 and the solid electrolyte layer 118 in contact with the reference electrode 142. The inside of the reference oxygen chamber 146 is filled with a porous material.

There is further a second measurement chamber 148 defined between the solid electrode layer 114 and the solid electrolyte layer 118 through the insulating layer 115, the solid electrode layer 116 and the insulating layer 117 in the upstream NOx sensor 6 such that the exhaust gas discharged from the first measurement chamber 121 via the diffusion resistance member 123 is introduced into the second measurement chamber 148.

The upstream NOx sensor 6 has a second pumping cell 150 constituted by the solid electrolyte layer 118 and pumping electrodes 151 and 152. In the first embodiment, the pumping electrodes 151 and 152 are formed predominantly of platinum. The pumping electrode 151 is disposed on a surface of the solid electrolyte layer 118 in contact with the second measurement chamber 148. The pumping electrode 152 is disposed on a surface of the solid electrolyte layer 118 facing the reference electrode 142 through the reference oxygen chamber 146.

The upstream NOx sensor 6 has a heater 160. The heater 160 is in the form of a heating resistor composed predominantly of platinum or the like to generate heat upon energization thereof and is located between the insulating layer 119 and the insulating layer 120.

The NOx sensor controller 7 includes a control circuit module 180 and a microcomputer 190 (hereinafter also referred to as "micon 190").

The control circuit module 180 is in the form of an analog circuit module mounted on a circuit board. More specifically, the control circuit module 180 has a Ip1 drive circuit 181, a Vs detection circuit 182, a reference voltage comparison circuit 183, a Icp supply circuit 184, a Vp2 application circuit 185, a Ip2 detection circuit 186 and a heater drive circuit 187.

The pumping electrode 131, the detection electrode 141 and the pumping electrode 151 are connected to a reference potential. The pumping electrode 132 is connected to the Ip1 drive circuit 181. The reference electrode 142 is connected to the Vs detection circuit 182 and to the Icp supply circuit 184. The pumping electrode 152 is connected to the Vp2 application circuit 185 and to the Ip2 detection circuit 186. The heater 160 is connected to the heater drive circuit 187.

The Ip1 drive circuit 181 supplies a first pumping current Ip1 between the pumping electrode 131 and the pumping electrode 132 and detects the supplied first pumping current Ip1.

The Vs detection circuit 182 detects a voltage Vs between the detection electrode 141 and the reference electrode 142 and outputs the detected voltage to the reference voltage comparison circuit 183.

The reference voltage comparison circuit 183 compares the output (voltage Vs) of the Vs detection circuit 182 with a reference voltage (e.g. 425 mV) and outputs the comparison result to the drive circuit 181. The drive circuit 181 controls the direction and intensity of flow of the first pumping current Ip1 such that the voltage Vs becomes equal to the reference voltage, and adjusts the concentration of oxygen in the first measurement chamber 121 to a predetermined level at which there does not occur decomposition of NOx.

The Icp supply circuit 184 supplies a small current Icp between the detection electrode 141 and the reference electrode 142. With the supply of such a small current, oxygen is pumped from the first measurement chamber 121 to the reference oxygen chamber 146 through the solid electrolyte layer 116 such that the concentration of oxygen in the reference oxygen chamber 146 becomes set to a predetermined reference oxygen concentration.

The Vp2 application circuit 185 applies a constant voltage Vp2 (e.g. 450 mV) between the pumping electrode 151 and the pumping electrode 152. With the application of such a constant voltage, NOx is dissociated (reduced) in the second measurement chamber 148 by the catalytic activities of the pumping electrodes 151 and 152 of the second pumping cell 150. The thus-obtained oxygen ions flow through the solid electrolyte layer 118 between the pumping electrode 151 and the pumping electrode 152, thereby developing a second pumping current Ip2. The Ip2 detection circuit 186 detects the developed second pumping current Ip2.

The heater drive circuit 187 drives the heater 160 by the application of a positive energization voltage to one end of the heating resistor and a negative energization voltage to the other end of the heating resistor.

The microcomputer 190 has a CPU 191, a ROM 192, a RAM 193 a signal input/output part 194.

The CPU 191 performs various processing for control of the upstream NOx sensor 6 according to programs stored in the ROM 192. The signal input/output part 194 is connected to the Ip1 drive circuit 181, the Vs detection circuit 182, the Ip2 detection circuit 186 and the heater drive circuit 187.

For example, the CPU 191 controls the operations of the NOx sensor so as to adjust the concentration of oxygen in the first measurement chamber 121 by the pumping action of the first pumping cell 130 and set the concentration of oxygen in the second measurement chamber 148 to a NOx-detectable concentration level at which NOx detection is possible, and determines the NOx concentration of the exhaust gas based on the value of the second pumping current Ip2. Further, the CPU 191 outputs a drive signal to the heater drive circuit 187 through the signal input/output part 194 and thereby controls the heater 160.

Figure 3:
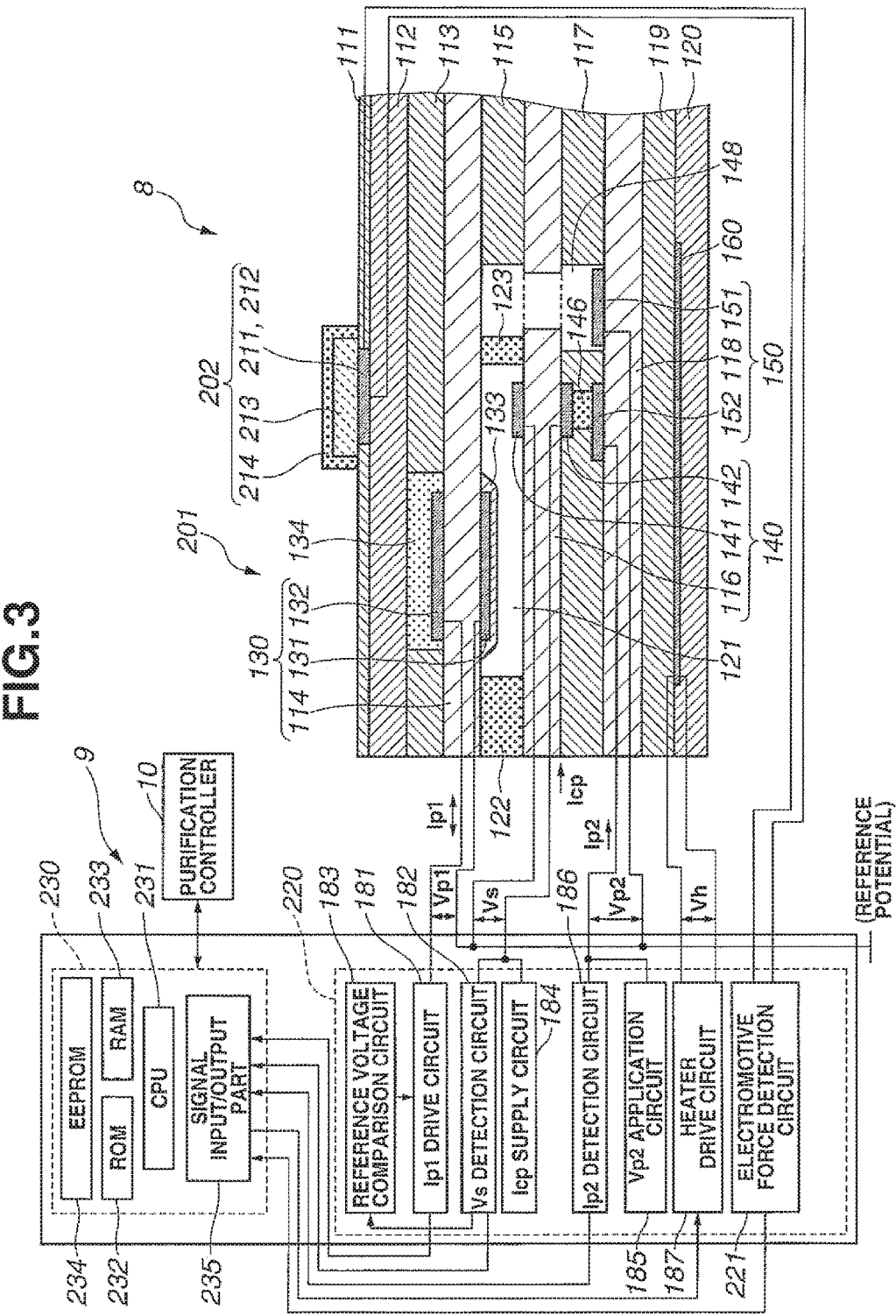
FIG. 3 is a configuration diagram of a multi-gas sensor 8 and a multi-gas sensor controller 9 in the urea SCR system.

As shown in FIG. 3, the multi-gas sensor 8 includes a NOx sensor unit 201 and an ammonia sensor unit 202.

The NOx sensor unit 201 has the same structure as that of the upstream NOx sensor 6, except that: a solid electrolyte layer 112 is stacked on the insulating layer 113; and an insulating layer 111 is stacked on the solid electrolyte layer 112. In the first embodiment, the insulating layer 111 is formed predominantly of alumina; and the solid electrolyte layer 112 is formed predominantly of oxygen ion conductive zirconia.

The ammonia sensor unit 202 has a detection electrode 211, a reference electrode 212, a selective reaction layer 213 and a diffusion layer 214.

Figure 4:
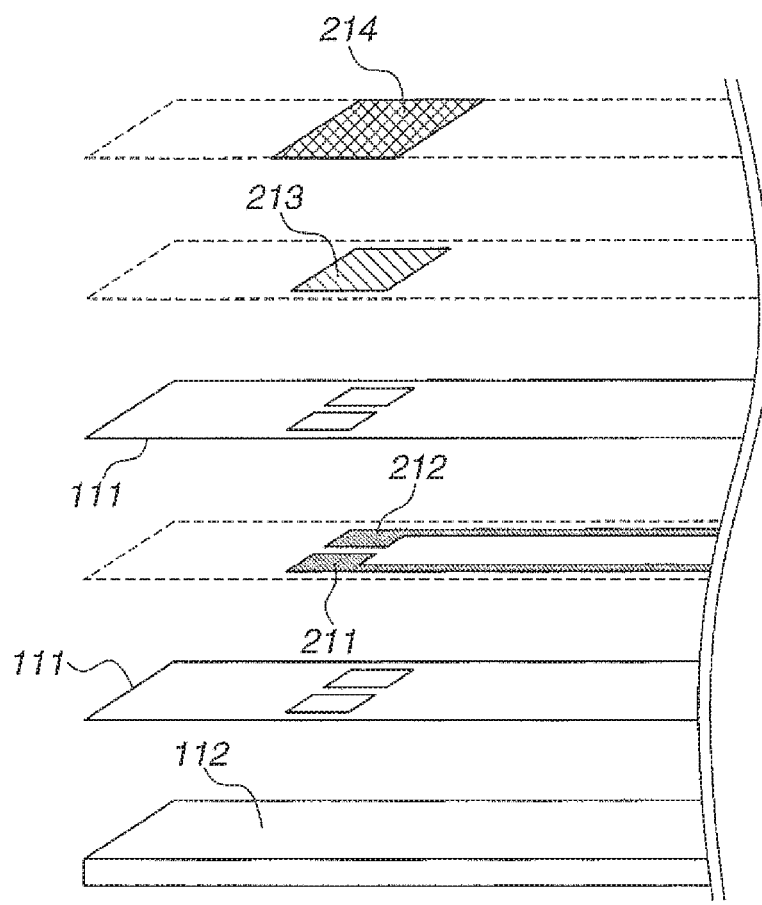
FIG. 4 is an exploded perspective view of an ammonia sensor unit 202 of the multi-gas sensor.

As shown in FIG. 4, the detection electrode 211 and the reference electrode 212 are located apart from each other on the solid electrolyte layer 112. In the first embodiment, the detection electrode 211 is formed of a material containing gold as a main component; and the reference electrode 212 is formed of a material containing platinum as a main component. Since the detection electrode 211 shows higher reactivity to ammonia than the reference electrode 212, there is developed an electromotive force between the detection electrode 211 and the reference electrode 212.

The selective reaction layer 213 is formed predominantly of a metal oxide no as to cover the detection electrode 211 and the reference electrode 212. The selective reaction layer 213 has the function of combusting any combustible gas component other than ammonia such that the ammonia sensor unit 202 can detect ammonia in the exhaust gas without being influenced by the combustible gas component.

The diffusion layer 214 is formed of a porous material so as to cover the selective reaction layer 213. The diffusion layer 214 has the function of adjusting the diffusion rate of the exhaust gas introduced from the outside into the ammonia sensor unit 202.

The multi-gas sensor controller 9 includes a control circuit module 220 and a microcomputer 230 as shown in FIG. 3.

The control circuit module 220 is different from the control circuit module 180 of the NOx sensor controller 7, in that an electromotive force detection circuit 221 is additionally provided. The electromotive force detection circuit 221 detects the electromotive force developed between the detection electrode 211 and the reference electrode 212 (hereinafter referred to as "ammonia electromotive force EMF") and outputs the detection result as a detection signal to the microcomputer 230.

The microcomputer 230 has a CPU 231, a ROM 232, a RAM 233, an EEPROM 234 and a signal input/output part 235.

The CPU 231 performs various processing for control of the multi-gas sensor 8 according to programs stored in the ROM 232. The signal input/output part 235 is connected to the Ip1 drive circuit 181, the Vs detection circuit 182, the Ip2 detection circuit 186, the heater drive circuit 187 and the electromotive force detection circuit 221.

The CPU 231 determines the NOx concentration in the same manner as the CPU 191. The CPU 231 also determines the oxygen concentration based on the direction and intensity of flow of the first pumping current Ip1.

Further, the CPU 231 determines the ammonia concentration by converting the ammonia electromotive force EMF to an ammonia concentration value according to an ammonia concentration correction formula. The ammonia concentration correction formula represents a correlation of the ammonia concentration value calculated according to a correlation formula between the ammonia electromotive force EMF and the oxygen concentration (hereinafter referred to as "electromotive force-converted ammonia concentration") with the ammonia concentration value calculated from the downstream NOx concentration and the downstream oxygen concentration (hereinafter referred to as "NOx output-converted ammonia concentration"). Herein, the ammonia concentration correction formula is a linear equation using an offset and a gradient as coefficients and using, as a variable, the electromotive force-converted ammonia concentration calculated from the ammonia electromotive force EMF and the oxygen concentration. The offset and gradient of the ammonia concentration correction formula are stored as first and second ammonia concentration correction factors in the EEPROM 234.

Furthermore, the CPU 231 outputs a drive signal to the heater drive circuit 187 through the signal input/output part 235 and thereby controls the the heater 160.

The microcomputer 230 of the multi-gas sensor controller 9 executes a concentration determination process.

The procedure of the concentration determination process will be explained below. The concentration determination process is initiated immediately after start-up of the microcomputer 230 of the multi-gas sensor controller 9.

Figure 5:
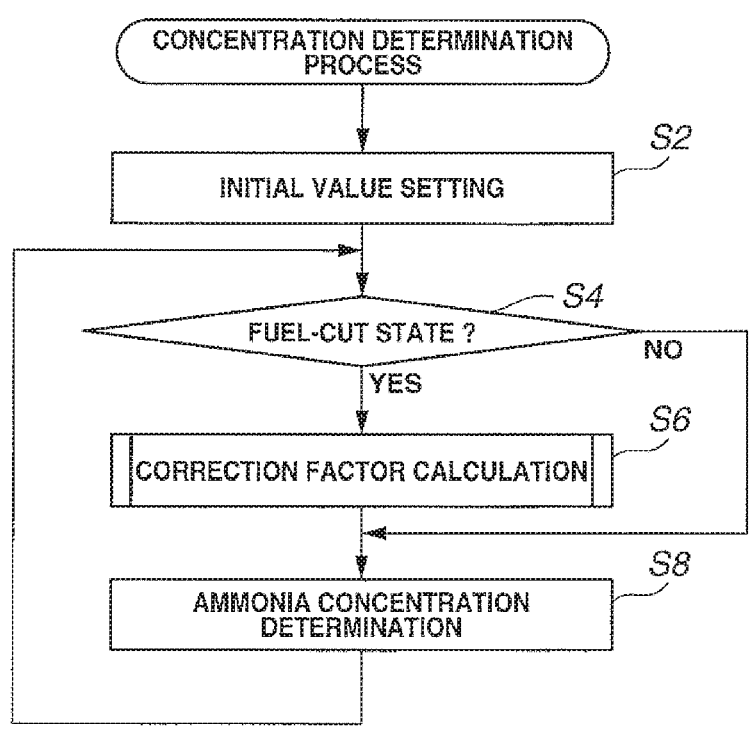
FIG. 5 is a flow chart of a concentration determination process according to the first embodiment of the present invention.

Upon initiation of the concentration determination process, the CPU 231 of the microcomputer 230 set various ammonia concentration determination parameters to predetermined initial values in step S2 as shown in FIG. 5. By the processing of step S2, the above-mentioned first and second ammonia concentration correction factors are set to their respective initial values; and the after-mentioned initial flag is cleared.

Next, the CPU judges in step S4 whether the diesel engine 51 is in a fuel-cut state in which fuel supply is stopped. The diesel engine 51 is judged as being in the fuel-cut state when the fuel-cut signal from the purification controller 10 is ON. When the fuel-cut signal from the purification controller 10 is OFF, the diesel engine 51 is judged as not being in the fuel-cut state. The fuel-cut signal indicates whether or not the diesel engine 51 is in the fuel-cut state. The ON state of the fuel-cut signal refers to the case where the voltage level of the fuel-cut signal is set high during fuel-cut operation of the engine. The OFF state of the fuel-cut signal refers to the case where the voltage level of the fuel-cut signal is set low during non-fuel-cut operation of the engine. This fuel-cut signal is sent from the engine ECU 53 to the purification controller 10, and then, sent from the purification controller 10 to the multi-gas sensor controller 9.

When the diesel engine is not in the fuel-cut state (NO in step S4), the CPU proceeds to step S8. When the diesel engine is in the fuel-cut state (YES in step S4), the CPU proceeds to the execution of the after-mentioned correction factor calculation in step S6 and then proceeds to step S8.

In step S8, the CPU determines the electromotive force-converted ammonia concentration according to the correlation formula between the ammonia electromotive force EMF and the oxygen concentration as mentioned above. Further, the CPU converts the electromotive force-converted ammonia concentration to the NOx output-converted ammonia concentration according to the ammonia concentration correction formula in step S8. The CPU proceeds to step S4 after the completion of step S8.

The procedure of the correction factor calculation process executed in step S6 will be next explained below.

Figure 6:
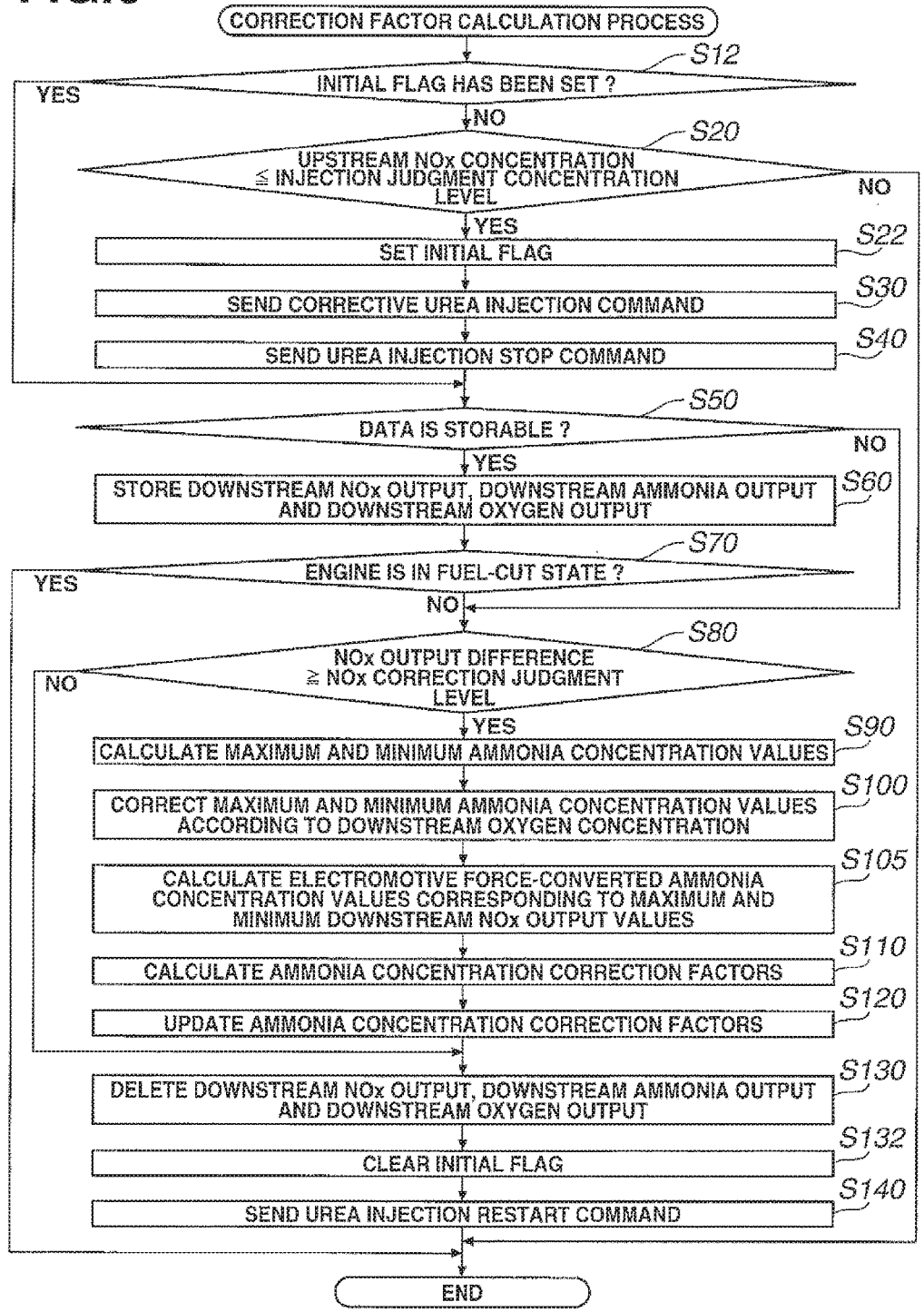
FIG. 6 is a flow chart of a correction factor calculation process according to the first embodiment of the present invention.

Upon initiation of the correction factor calculation process, the CPU 231 of the microcomputer 230 judges whether or not the initial flag has been set in step S12 as shown in FIG. 6. The initial value of the initial flag is set to zero. Namely, the initial flag is cleared in the initial state.

When the initial flag has been set (YES in step S12), the CPU proceeds to step S50. When the initial flag has not been set (NO in step S12), the CPU proceeds to step S20. In step S20, the CPU judges whether or not the upstream NOx concentration indicated by the upstream NOx concentration data is lower than or equal to a predetermined injection judgment concentration level. In the first embodiment, the injection judgment concentration level is set to or around 0 ppm. The upstream NOx concentration data is retrieved by communication between the multi-gas sensor controller 9 and the purification controller 10. When the upstream NOx concentration exceeds the injection judgment concentration level (NO in step S20), the correction factor calculation process ends. When the upstream NOx concentration is lower than or equal to the injection judgment concentration level (YES in step S20), the CPU proceeds to step S22. In step S22, the CPU sets the initial flag. Then, the CPU sends a corrective urea injection command to the purification controller 10 in step S30. According to this injection command, the purification controller 10 controls the aqueous urea injector 5 to inject a predetermined corrective injection amount of aqueous urea for correction. In step S40, the CPU sends an urea injection stop command to the purification controller 10. According to this injection stop command, the purification controller 10 temporarily stops the urea injection operation control of the aqueous urea injector 5.

In step S50, the CPU judges whether data is storable in the RAM 233 and, more specifically, judges whether the free space of the RAM 233 is greater than or equal to a predetermined data storage judgment capacity. The data storage judgment capacity refers to the data capacity required for the after-mentioned data storage in step S60. When data is not storable in the RAM 233 (NO in step S50), the CPU proceeds to step S80.

When data is storable in the RAM 233 (YES in step S50), the CPU proceeds to step S60. In step S60, the CPU stores in the RAM 233 the latest values of the downstream NOx output, the downstream ammonia output and the downstream oxygen output value retrieved from the multi-gas sensor 8. In the first embodiment, the value of the second pumping current Ip2 is retrieved as the downstream NOx output; the value of the ammonia electromotive force EMF is retrieved as the downstream ammonia output; and the value of the first pumping current Ip2 is retrieved as the downstream oxygen output.

In step S70, the CPU judges whether or not the engine is in the fuel-cut state in the same manner as in step S4. When the engine is in the fuel-cut state (YES in step S70), the correction factor calculation process ends. When the engine is not in the fuel-cut state (NO in step S70), the CPU proceeds to step S80.

In step S80, the CPU judges whether the NOx output difference is larger than or equal to a predetermined NOx correction judgment level. The NOx sensor output difference refers to the difference between the maximum and minimum values among the plurality of downstream NOx output values stored in the RAM 233. When the NOx output difference is smaller than the NOx correction judgment level (NO in step S80), the CPU proceeds to step S130.

When the NOx output difference is larger than or equal to the NOx correction judgment level (YES in step S80), the CPU proceeds to step S90. In step S90, the CPU determines the ammonia concentration values corresponding to the maximum and minimum values of the downstream NOx output stored in the RAM 233 with reference to a predetermined ammonia concentration determination map. The ammonia concentration determination map defines a correlation between the downstream NOx output and the ammonia concentration and has been stored in the ROM 232. Hereinafter, the ammonia concentration value corresponding to the maximum value of the downstream NOx output is referred to as "maximum ammonia concentration value"; and the ammonia concentration value corresponding to the minimum value of the downstream NOx output is referred to as "minimum ammonia concentration value".

As step S100, the CPU corrects the maximum and minimum ammonia concentration values according to the downstream oxygen concentration. More specifically, the maximum and minimum ammonia concentration values are corrected as follows. First, an oxygen concentration adjustment factor for the downstream oxygen output corresponding to the maximum value of the downstream NOx output (hereinafter referred to as "maximum concentration adjustment factor") is set with reference a predetermined adjustment factor setting map. The adjustment factor setting map defines a correlation between the downstream oxygen output and the oxygen concentration adjustment factor and has been stored in the ROM 232. Similarly, an oxygen concentration adjustment factor for the downstream oxygen output corresponding to the minimum value of the downstream NOx output (hereinafter referred to as "minimum concentration adjustment factor") is set with reference to the adjustment factor setting map. Then, the maximum ammonia concentration value is corrected to a corrected maximum ammonia concentration value by multiplying the maximum ammonia concentration value by the maximum concentration adjustment factor. The minimum ammonia concentration value is similarly corrected to a corrected minimum ammonia concentration value by multiplying the minimum ammonia concentration value by the minimum concentration adjustment factor.

In step S105, the CPU determines values of the electromotive force-converted ammonia concentration based on the downstream ammonia output (i.e. ammonia electromotive force EMF) and the downstream oxygen output corresponding to the maximum and minimum values of the downstream NOx output.

In step S110, the CPU calculates the above-mentioned first and second ammonia concentration correction factors from the corrected maximum and minimum ammonia concentration values. More specifically, the first and second ammonia concentration correction factors are calculated as follows. In the two-dimensional orthogonal coordinate system where: the electromotive force-converted ammonia concentration is taken along the X axis; and the NOx output-converted ammonia concentration is taken along the Y axis, the linear equation is set up to indicate a straight line connecting a coordinate point corresponding to the corrected maximum ammonia concentration value (hereinafter referred to as "maximum coordinate point") and a coordinate point corresponding to the corrected minimum ammonia concentration value (hereinafter referred to as "minimum coordinate point"). The offset and gradient of the linear equation are taken as the first and second ammonia concentration correction factors, respectively. Herein, the maximum coordinate point refers to the point of (x1, y1) in the two-dimensional orthogonal coordinate system on the assumption that: x1 is the electromotive force-converted ammonia concentration corresponding to the corrected maximum ammonia concertation value; and y1 is the corrected maximum ammonia concertation value; and the minimum coordinate point refers to the point of (x2, y2) in the two-dimensional orthogonal coordinate system on the assumption that: x2 is the electromotive force-converted ammonia concentration corresponding to the corrected minimum ammonia concertation value; and y2 is the corrected minimum ammonia concertation value.

In step S120, the CPU replaces the first and second ammonia concentration correction factors stored in the EEPROM 234 with those calculated in step S110 and thereby updates the first and second ammonia concentration correction factors. The CPU then proceeds to step S130.

In step S130, the CPU deletes all of the downstream NOx output, the downstream ammonia output and the downstream oxygen output stored in the RAM 233. In step S132, the CPU clears the initial flag. In step S140, the CPU sends an urea injection restart command to the purification controller 10. According to this injection restart command, the purification controller 10 restarts the urea injection operation control of the aqueous urea injector 5.

FIGS. 7A, 7B, 8A and 8B shows examples of changes of the downstream NOx output and the downstream ammonia output when the injection of the urea is performed in the fuel-cut state. In FIGS. 7A, 7B, 8A and 8B, the aqueous urea is injected by the aqueous urea injector 5 under the conditions that the fuel-cut signal is turned to the ON state (see arrow FC1) and the upstream NOx concentration is lower than or equal to the injection judgment concentration level; and, after the injection of the aqueous urea, the fuel-cut signal is turned to the OFF state (see arrow FC2).

Figure 7A:
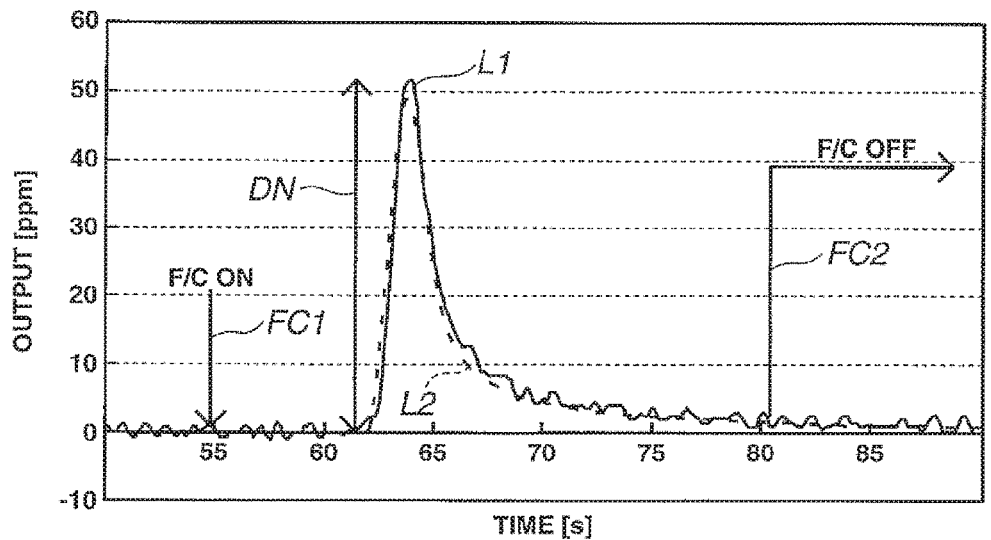
FIGS. 7A and 7B are graphs showing changes of downstream NOx output and downstream ammonia output in the case where concentration correction factors are updated according to the first embodiment of the present invention.

FIG. 7A refers to the case where, after the injection of the aqueous urea, the maximum value of the downstream NOx output L1 is large and is substantially equal to the maximum value of the downstream ammonia output L2. In this case, the first and second ammonia concentration correction factors are updated because the NOx output difference DN is larger than or equal to the NOx correction judgment level.

Figure 7B:
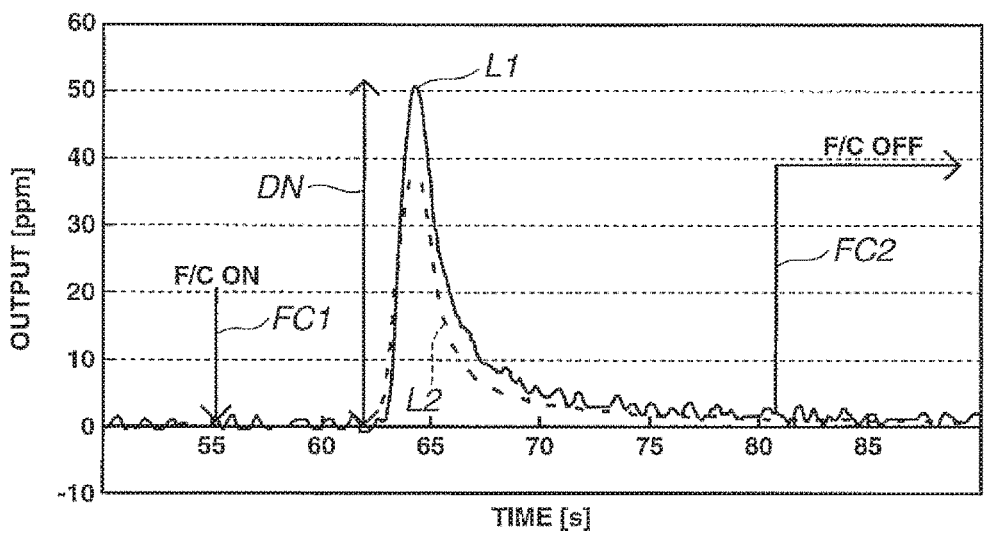

FIG. 7B refers to the case where, after the injection of the aqueous urea, the maximum value of the downstream NOx output L1 is large, and the maximum value of the downstream ammonia output L2 is smaller than the maximum value of the downstream NOx output L1. In this case, the first and second ammonia concentration correction factors are also updated because the NOx output difference DN is larger than or equal to the NOx correction judgment level.

Figure 8A:
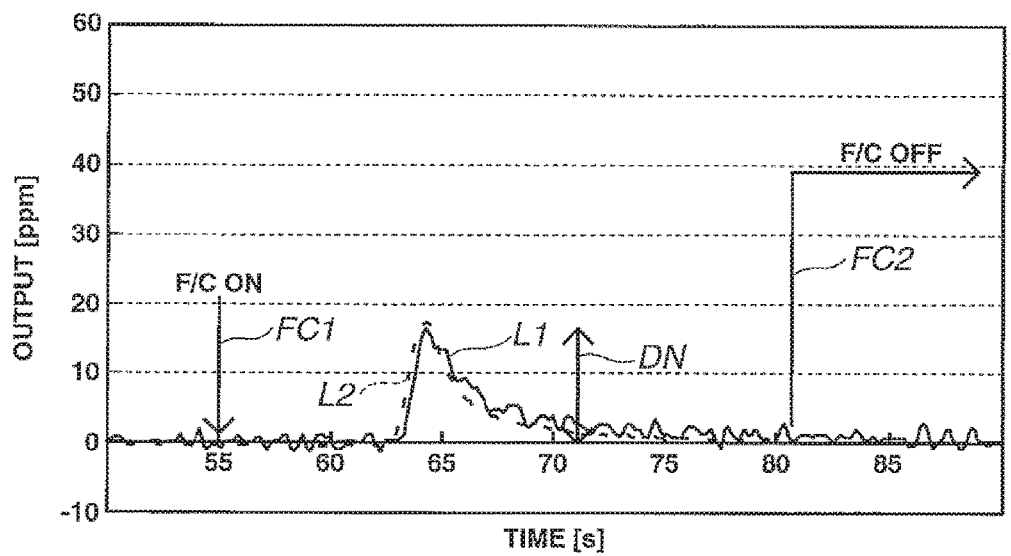
FIGS. 8A and 8B are graphs showing changes of downstream NOx output and downstream ammonia output in the case where concentration correction factors are not updated.

FIG. 8A refers to the case where, after the injection of the aqueous urea, the maximum value of the downstream NOx output L1 is small and is substantially equal to the maximum value of the downstream ammonia output L2. In this case, the first and second ammonia concentration correction factors are not updated because the NOx output difference DN is smaller than the NOx correction judgment level.

Figure 8B:
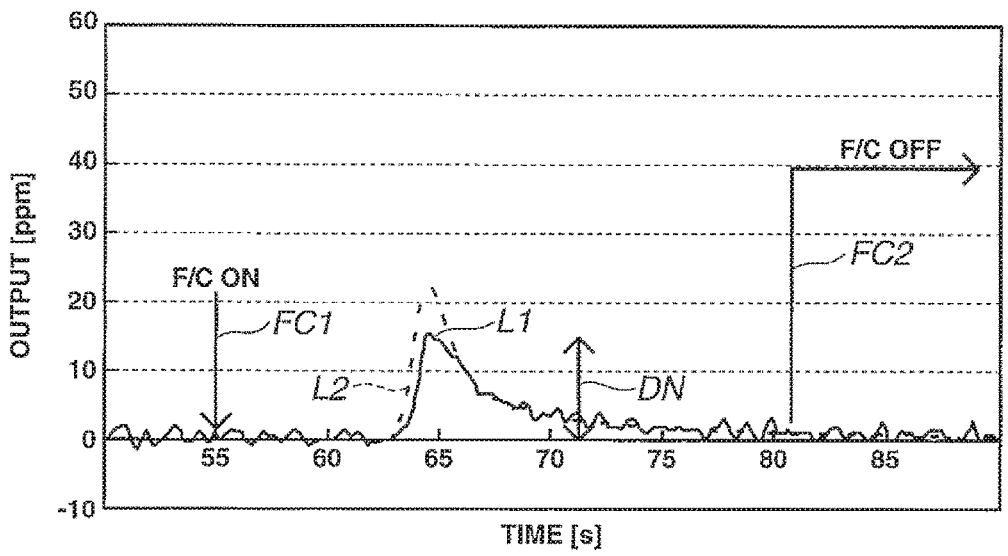

FIG. 8B refers to the case where, after the injection of the aqueous urea, the maximum value of the downstream NOx output L1 is small and, and the maximum value of the downstream ammonia output L2 is larger than the maximum value of the downstream NOx output L1. In this case, the first and second ammonia concentration correction factors are not also updated because the NOx output difference DN is smaller than the NOx correction judgment level.

As discussed above, the multi-gas sensor controller 9 is provided in the urea SCR system 1 with the SCR catalyst 4, the aqueous urea injector 5, the ammonia sensor unit 202 and the NOx sensor unit 201. The multi-gas sensor controller 9 determines the downstream ammonia concentration based on the detection result of the ammonia sensor unit 202.

Further, the multi-gas sensor controller 9 controls the aqueous urea injector 5 to supply the urea to the SCR catalyst 4 in the fuel-cut state where the fuel supply to the diesel engine 51 is stopped (steps S2 and S30).

The multi-gas sensor controller 9 then corrects the determined downstream ammonia concentration value by updating the first and second ammonia concentration correction factors based on the detection result of the NOx sensor unit 201 and the oxygen concentration of the exhaust gas after the supply of the urea to the SCR catalyst 4 with the control of the aqueous urea injector 5 (steps S50 to S120).

In this way, the multi-gas sensor controller 9 is configured to permit the supply of urea from the aqueous urea injector 5 in the fuel-cut state. In the fuel-cut state, the fuel supply to the diesel engine 51 is stopped so that NOx is not contained in the exhaust gas of the diesel engine 51. Herein, the NOx sensor unit 201 performs concentration detection responsive to not only NOx but also ammonia. Thus, the detection result of the NOx sensor unit 201 is in correlation with the ammonia concentration after the urea is supplied to the SCR catalyst 4 in the fuel-cut state. It is therefore possible for the multi-gas sensor controller 9 to, even in the case where the detection result of the ammonia sensor unit 202 is not stable due to secular variations or daily variations, ensure the stability of the determined downstream ammonia concentration value by correcting the determined downstream ammonia concentration value based on the detection result of the NOx sensor unit 202.

Since the downstream ammonia concentration detection result of the NOx sensor unit 201 varies depending on the oxygen concentration of the exhaust gas, the multi-gas sensor controller 9 corrects the determined downstream ammonia concentration value based on not only the downstream NOx concentration detection result of the NOx sensor unit 201 but also the oxygen concentration of the exhaust gas. It is therefore possible for the multi-gas sensor controller 9 to further improve the determination accuracy of the downstream ammonia concentration.

Further, the multi-gas sensor controller 9 is configured to prohibit the correction of the determined downstream ammonia concentration value by prohibiting the updating of the first and second ammonia concentration correction factors when the upstream NOx concentration exceeds the injection judgment concentration level (NO in step S20). It is therefore possible for the multi-gas sensor controller 9 to further improve the determination accuracy of the downstream ammonia concentration by avoiding correcting the determined downstream ammonia concentration value based on the detection result of the NOx sensor unit under a situation that a large amount of NOx is contained in the exhaust gas even in the fuel-cut state.

In the first embodiment, the NOx sensor unit 201 is in the form of a limiting-current type gas sensor. The NOx sensor unit 201 thus allows, when the exhaust gas is introduced into the first measurement chamber 121, the first pumping cell 130 to perform oxygen pumping action on the exhaust gas in the first measurement chamber 121 and thereby maintain the oxygen concentration of the exhaust gas in the first measurement chamber 121 at a constant value. Namely, the NOx sensor unit 201 has the function of detecting the oxygen concentration of the exhaust gas according to the direction and intensity of flow of the first pumping current Ip1. By the use of such a limiting-current sensor unit, it is possible to simplify the configuration of the urea SCR system 1 without the need to provide a separate oxygen sensor for detecting the oxygen concentration of the exhaust gas.

Furthermore, the ammonia sensor unit 202 and the NOx sensor unit 201 are integrated as one multi-gas sensor 8 in the first embodiment. In this case, the ammonia sensor unit 202 and the NOx sensor unit 201 are used to detect the downstream ammonia concentration of the exhaust gas in substantially the same region. Namely, the ammonia sensor unit 202 and the NOx sensor unit 201 do not differ in their exhaust gas concentration detection region. By the use of such an integrated gas sensor, it is possible to further improve the determination accuracy of the downstream ammonia concentration.

In the above-explained first embodiment, the multi-gas sensor controller 9 corresponds to the claimed concentration determination device; the diesel engine 51 corresponds to the claimed internal combustion engine; the SCR catalyst 4 corresponds to the claimed selective catalytic reduction catalyst; the aqueous urea injector 5 corresponds to the claimed urea supply unit; the ammonia sensor unit 202 corresponds to the claimed ammonia sensor; the NOx sensor unit 201 corresponds to the claimed NOx sensor; and the urea SCR system 1 corresponds to the claimed purification system.

The processing of steps S2 and S30 correspond to the claimed urea supply control section or step; the processing of steps S50 to S120 correspond to the claimed urea supply correction section or step; and the processing of step S20 corresponds to the claimed prohibition section.

The electromotive force-converted ammonia concentration corresponds to the claimed first converted ammonia concentration; and the NOx output-converted ammonia concentration corresponds to the claimed second converted ammonia concentration.

Second Embodiment

A second embodiment of the present invention will be next described below with reference to the drawings. The following description will be focused on the differences of the second embodiment from the first embodiment.

An urea SCR system 1 of the second embodiment is similar to that of the first embodiment, except for the procedure of the correction factor calculation process.

The correction factor calculation process of the second embodiment is similar to that of the first embodiment, except that the processing of step S25 is executed in place of the processing of step S20.

As shown in FIG. 9, when the initial flag has not been set (NO in step S12), the multi-gas sensor controller 9 judges in step S25 whether the latest determined downstream NOx concentration value is lower than or equal to an injection judgement concentration level. When the downstream NOx concentration value exceeds the injection judgement concentration level (NO in step S25), the correction factor calculation process ends. When the downstream NOx concentration value is lower than or equal to the injection judgement concentration level (YES in step S25), the controller proceeds to step S22.

As discussed above, the multi-gas sensor controller 9 is configured to prohibit the updating of the first and second ammonia concentration correction factors when the downstream NOx concentration value exceeds the injection judgment concentration level (NO in step S25). It is therefore possible for the multi-gas sensor controller 9 to further improve the determination accuracy of the downstream ammonia concentration by, even in the fuel-cut state, avoiding correcting the determined downstream ammonia concentration value based on the detection result of the NOx sensor under a situation that a large amount of NOx is contained in the exhaust gas.

In the above-explained second embodiment, the processing of step S25 corresponds to the claimed prohibition section.

Third Embodiment

A third embodiment of the present invention will be described below with reference to the drawings. The following description will be focused on the differences of the third embodiment from the first embodiment.

An urea SCR system 1 of the third embodiment is similar to that of the first embodiment, except for the procedure of the concentration determination process.

The concentration determination process of the third embodiment is similar to that of the first embodiment, except that the processing of step S3 is additionally executed in the concentration determination process.

Figure 10:
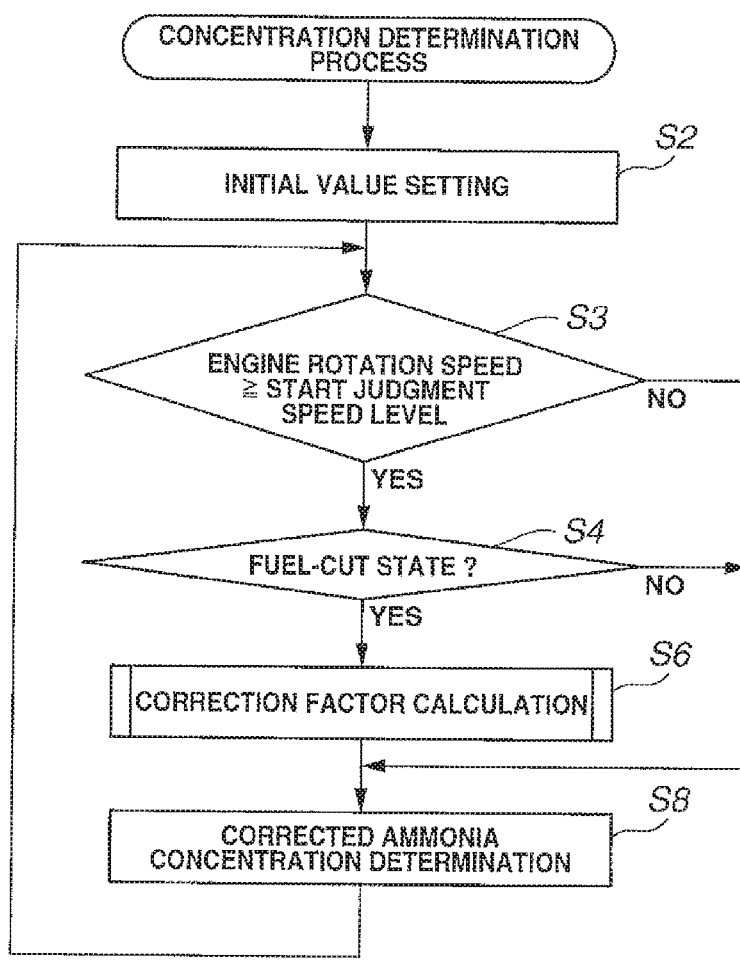
FIG. 10 is a flow chart for a concentration determination process according to a third embodiment of the present invention.

As shown in FIG. 10, after the completion of step S2, the controller judges in step S3 whether the rotation speed of the engine is higher than or equal to a predetermined start judgment speed level. When the engine rotation speed is lower than the start judgment speed level (NO in step S3), the controller proceeds to step S8. When the engine rotation speed is higher than or equal to the start judgment speed level (YES in step S3), the controller proceeds to step S4.

Further, the controller proceeds back to step S3 after the completion of step S8.

As discussed above, the multi-gas sensor controller 9 is configured to calculate the first and second ammonia concentration correction factors when the flow rate of the exhaust gas in the exhaust pipe 52 is higher than or equal to a predetermined level. It is therefore possible for the multi-gas sensor controller 9 to prevent a deterioration in the ammonia concentration detection accuracy of the upstream NOx sensor 6 caused by combustion of ammonia gas due to heat inside the upstream NOx sensor 6 in the case where the flow rate of the exhaust gas is low.

Fourth Embodiment

A fourth embodiment of the present invention will be described below with reference to the drawings. The following description will be focused on the differences of the fourth embodiment from the first embodiment.

Figure 11:
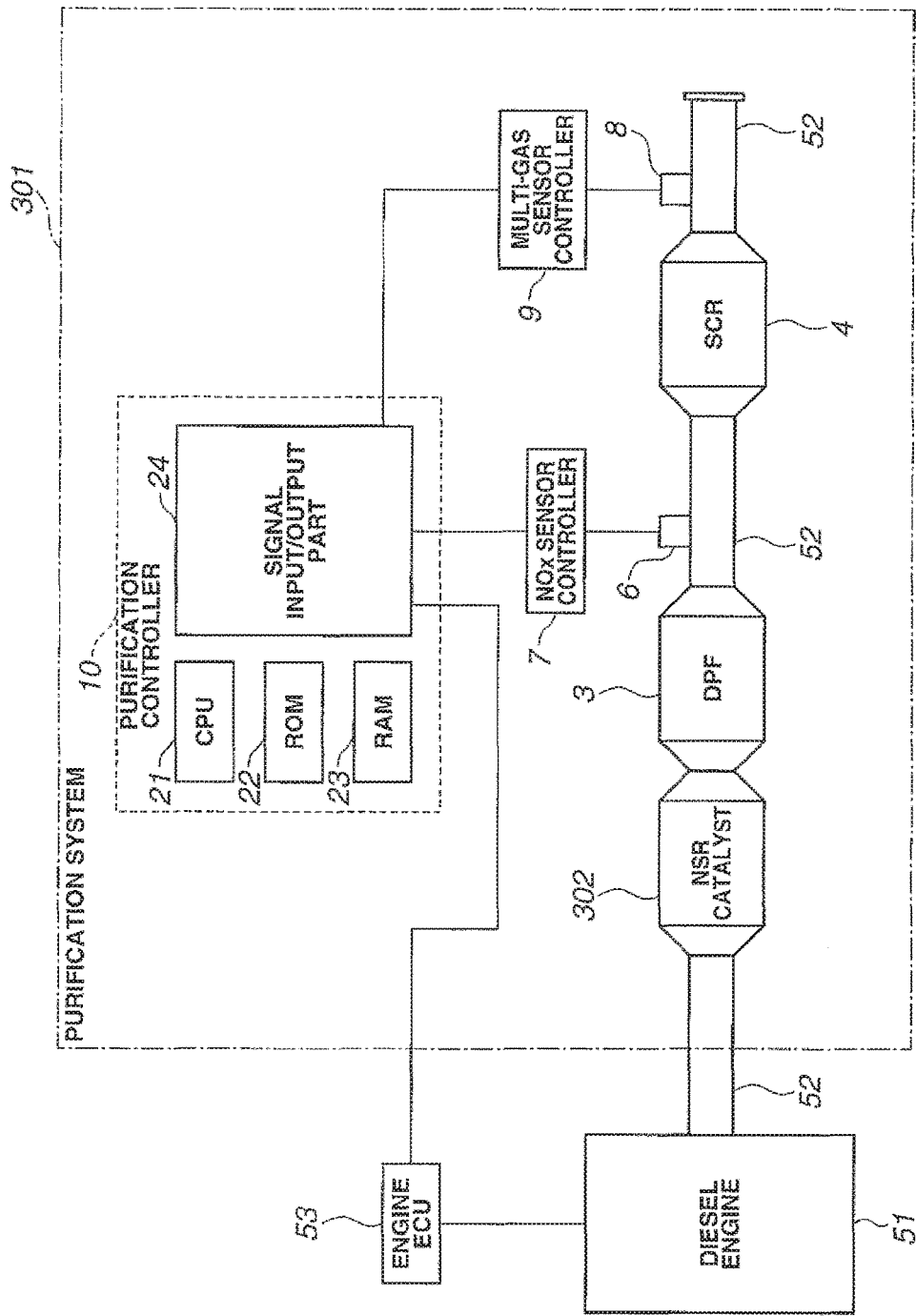
FIG. 11 is a schematic diagram of a purification system 301 according to a fourth embodiment of the present invention.

As shown in FIG. 11, a purification system 301 of the fourth embodiment is different from the system of the first embodiment, in that: a NOx storage reduction catalyst 302 (hereinafter referred to as "NSR catalyst 302") is provided rather than the oxidation catalyst 2 and the aqueous urea injector 5.

The NSR catalyst 302 is arranged in the exhaust pipe 52 at a position between the diesel engine 51 and the DPF unit 3. When the exhaust gas in the exhaust pipe 52 is fuel-lean with respect to the stoichiometric air-fuel ratio, NOx in the exhaust gas is occluded and stored in the NSR catalyst 302. When the exhaust gas in the exhaust pipe 52 is fuel-rich with respect to the stoichiometric air-fuel ratio, nitrogen is generated at the NSR catalyst 302 by reduction of the occluded NOx with HC, CO etc. in the exhaust gas and then released from the NSR catalyst 302.

When the exhaust gas is in the fuel-rich state, ammonia is also generated at the NSR catalyst 302 by e.g. reduction of NO with CO and $H_2O$ as indicated in the following reaction schemes (1) and (2).

$$CO+H_2O \rightarrow H_2+CO_2 \tag{1}$$

$$2NO+3H_2+2CO \rightarrow 2NH_3+2CO_2 \tag{2}$$

The purification system 301 of the fourth embodiment is also different from the system of the first embodiment, in the procedure of the correction factor calculation process.

The correction factor calculation process of the fourth embodiment is similar to that of the first embodiment, except that: the processing of steps S30, S40 and S140 is omitted and the processing of step 35 is additionally executed in the correction factor calculation process.

Figure 12:
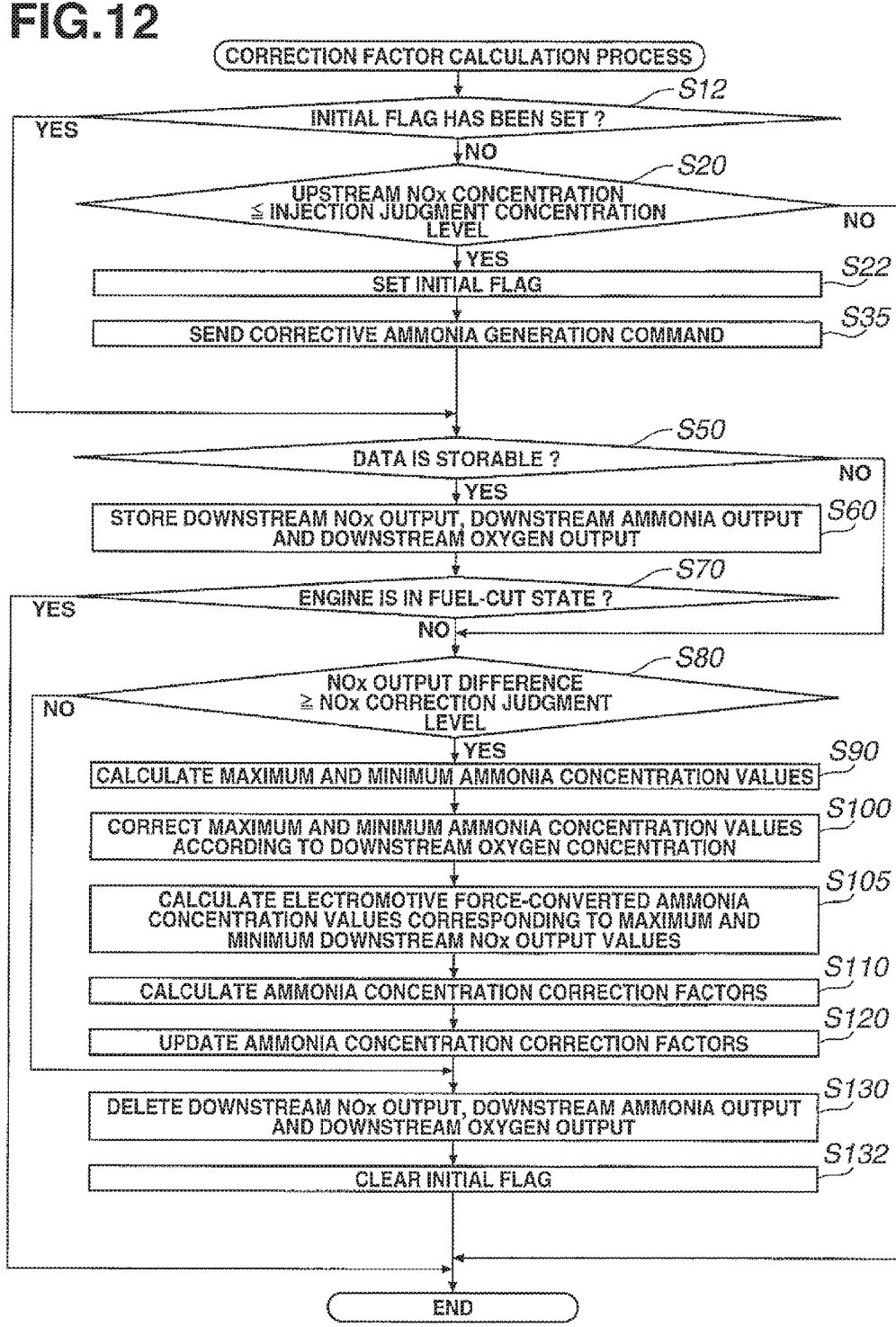
FIG. 12 is a flow chart for a concentration determination process according to the fourth embodiment of the present invention.

As shown in FIG. 12, after the completion of step S22, the controller sends a corrective ammonia generation command to the purification controller 10 in step S35. The controller then proceeds to step S50. The corrective ammonia generation command is sent from the purification controller 10 to the engine ECU 53. The engine ECU 53 executes rich spike control according this command. Under the rich spike control, the diesel engine 5 is operated in a state where the air-fuel ratio is temporarily set rich. Thus, the rich gas containing a large amount of unburned components and being deficient in oxygen is discharged from the diesel engine 51 during the execution of the rich spike control. With the flow of such a fuel-rich exhaust gas, ammonia gas is generated at the NSR catalyst 302 as mentioned above.

After the completion of step 132, the correction coefficient calculation process ends.

As discussed above, the multi-gas sensor controller 9 is provided in the purification system 301 with the SCR catalyst 4, the NSR catalyst 302, the ammonia sensor unit 202 and the NOx sensor unit 201. The multi-gas sensor controller 9 determines the downstream ammonia concentration based on the detection result of b the ammonia sensor unit 202.

Further, the multi-gas sensor controller 9 controls the NSR catalyst 302 to supply the ammonia to the SCR catalyst 4 in the fuel-cut state where the fuel supply to the diesel engine 51 is stopped (steps S10 and S35).

The multi-gas sensor controller 9 then corrects the determined downstream ammonia concentration value by updating the first and second ammonia concentration correction factors based on the detection result of the NOx sensor unit 201 and the oxygen concentration of the exhaust gas after the supply of the urea to the SCR catalyst 4 with the control of the NSR catalyst 302 (steps S50 to S120).

In this way, the multi-gas sensor controller 9 is configured to permit the supply of ammonia to the NSR catalyst 302 in the fuel-cut state. It is therefore possible for the multi-gas sensor controller 9 to ensure the stability of the determined downstream ammonia concentration value in the fourth embodiment in the same manner as in the first embodiment.

In the above-explained fourth embodiment, the NSR catalyst 302 corresponds to the claimed ammonia supply unit; the processing of steps S10 and S35 corresponds to the claimed ammonia supply control section or step; and the processing of steps S50 to S120 corresponds to the claimed ammonia supply correction section or step.

Although the present invention has been described with reference to the above specific embodiments, the present invention is not limited to those specific embodiments. Various changes and modifications of the above embodiments are possible within the technical scope of the present invention.

In the above embodiments, the NOx sensor controller 7, the multi-gas sensor controller 9 and the purification controller 10 are provided separately. It is however alternatively feasible to use, in place of the separate controllers 7, 9 and 10, an integrated control unit equipped with the functions of these controllers 7, 9 and 10.

Although the first and second ammonia concentration correction factors are calculated based on two downstream NOx output values in the above embodiments, it is alternatively feasible to calculate the first and second ammonia concentration correction factors based on three or more downstream NOx output values.

In the above embodiments, the first and second ammonia concentration correction factors are calculated upon judging that: the engine is in the fuel-cut state; and the upstream NOx concentration is lower than or equal to the injection judgement concentration level. However, it is alternatively feasible to calculate the first and second ammonia concentration correction factors after the lapse of a predetermined time from when the engine is placed in the fuel-cut state.

DESCRIPTION OF REFERENCE NUMERALS

1: Urea SCR system
4: SCR catalyst
5: Aqueous urea injector
6: Upstream NOx sensor
7: NOx sensor controller
8: Multi-gas sensor
9: Multi-gas sensor controller
10: Purification controller
201: NOx sensor unit
202: Ammonia sensor unit
301: Purification system
302: NSR catalyst

The invention claimed is:

1. A concentration determination device of a purification system,
the purification system comprising:
a selective catalytic reduction catalyst arranged in an exhaust pipe of an internal combustion engine to purify NOx in exhaust gas of the internal combustion engine;
a reducing agent supply unit arranged to supply urea or ammonia as a reducing agent to the selective catalytic reduction catalyst;
an ammonia sensor arranged to detect, as a downstream ammonia concentration, an ammonia concentration of the exhaust gas flowing out of the selective catalytic reduction catalyst; and
a NOx sensor arranged to detect, as a downstream NOx concentration, a NOx concentration of the exhaust gas flowing out of the selective catalytic reduction catalyst,
the concentration determination device being configured to determine a value of the downstream ammonia concentration based on a detection result of the ammonia sensor, the concentration determination device comprising:
a supply control section that controls the reducing agent supply unit to supply the reducing agent to the selective catalytic reduction catalyst in a fuel-cut state where fuel supply to the internal combustion engine is stopped;
a supply correction section that corrects the determined value of the downstream ammonia concentration based on a detection result of the NOx sensor and an oxygen concentration of the exhaust gas after the supply of the reducing agent to the selective catalytic reduction catalyst with the control of the reducing agent supply unit by the supply control section.

2. The concentration determination device as claimed in claim 1,
wherein the reducing agent supply unit is an urea supply unit that supplies urea as the reducing agent to the selective catalytic reduction catalyst;
wherein the concentration determination device converts the detection result of the ammonia sensor to an ammonia concentration value according to an ammonia concentration correction formula, which represents a correlation of first and second converted ammonia concentrations where the first converted ammonia concentration is a value calculated according to a correlation formula between the detection result of the ammonia sensor and the ammonia concentration of the exhaust gas; and the second converted ammonia concentration is a value calculated from the NOx sensor detection result and the oxygen concentration of the exhaust gas, and determines the ammonia concentration value as the downstream ammonia concentration; and wherein the supply correction section corrects the determined value of the downstream ammonia concentration by updating the ammonia concentration correction formula.

3. The concentration determination device as claimed in claim 2, further comprising: a prohibition section that, when the NOx concentration of the exhaust gas exceeds a predetermined prohibition judgement concentration level, prohibits the supply correction section from updating the ammonia concentration correction formula.

4. The concentration determination device as claimed in claim 1, wherein the reducing agent supply unit is an ammonia supply unit that supplies ammonia as the reducing agent to the selective catalytic reduction catalyst.

5. The concentration determination device as claimed in claim 1, wherein the NOx sensor is a limiting-current gas sensor.

6. The concentration determination device as claimed in claim 1, wherein the ammonia sensor and the NOx sensor are combined into one as an integrated gas sensor.

7. The concentration determination device as claimed in claim 1, wherein the ammonia sensor and the NOx sensor separately detect an ammonia concentration and a NOx concentration, respectively, of the exhaust gas flowing out of the selective catalytic reduction catalyst.

8. A concentration determination method for a purification system, the purification system comprising:

a selective catalytic reduction catalyst arranged in an exhaust pipe of an internal combustion engine to purify NOx in exhaust gas of the internal combustion engine;

a reducing agent supply unit arranged to supply urea or ammonia as a reducing agent to the selective catalytic reduction catalyst;

an ammonia sensor arranged to detect, as a downstream ammonia concentration, an ammonia concentration of the exhaust gas flowing out of the selective catalytic reduction catalyst; and a NOx sensor arranged to detect, as a downstream NOx concentration, a NOx concentration of the exhaust gas flowing out of the selective catalytic reduction catalyst, the concentration determination method being for determining a value of the downstream ammonia concentration based on a detection result of the ammonia sensor, the concentration determination method comprising:

controlling the reducing agent supply unit to supply to the reducing agent to the selective catalytic reduction catalyst in a fuel-cut state where fuel supply to the internal combustion engine is stopped; and correcting the determined value of the downstream ammonia concentration based on a detection result of the NOx sensor and an oxygen concentration of the exhaust gas after the supply of the reducing agent to the selective catalytic reduction catalyst by the controlling of the reducing agent supply unit.

9. The concentration determination method as claimed in claim 8, wherein the ammonia sensor and the NOx sensor separately detect an ammonia concentration and a NOx concentration, respectively, of the exhaust gas flowing out of the selective catalytic reduction catalyst.

* * * * *